Figure 1:
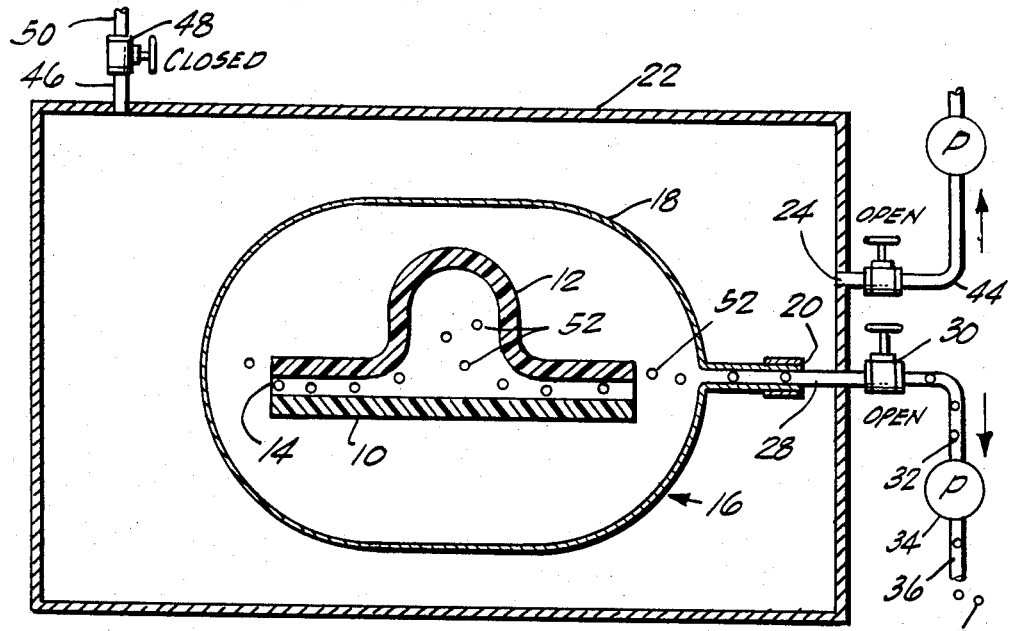

Oct. 8, 1968  C. A. SEIL ET AL  3,405,019

VACUUM BONDING PROCESS

Filed July 30, 1965

INVENTORS
GUY W. LIVELY
CHRISTIAN A. SEIL
BY
AGENT

United States Patent Office

3,405,019
Patented Oct. 8, 1968

3,405,019
VACUUM BONDING PROCESS
Christian A. Seil, Santa Monica, Calif., and Guy W. Lively, Flemington, N.J., assignors, by mesne assignments, to McDonnell Douglas Corporation, Santa Monica, Calif., a corporation of California
Filed July 30, 1965, Ser. No. 476,019
3 Claims. (Cl. 156—286)

This invention relates to a vacuum bonding process and more particularly to a method of eliminating the entrapment of air between the elements to be bonded during the bonding procedure.

Certain prior art bonding processes employ vacuum bagging as part of the process for the purpose of eliminating air between the surfaces to be bonded. An adhesive coating is placed between the elements to be bonded after which the resulting unit is placed in a collapsible bag. The bag is evacuated of all gases so that the encompassing sidewall of the bag is pressed tightly about the unit by atmospheric pressure. When bonding or laminating with viscous adhesives or with viscous resins, and particularly when dealing with irregular surfaces or surfaces of rather extensive area, this conventional vacuum bagging process has certain disadvantages. For example, during the vacuum process the atmospheric pressure exerted on the sidewall of the bag and on the unit to be bonded creates sufficient pressure that available gas leak paths are sealed and a portion of the gas originally present becomes entrapped between the surfaces of material.

Accordingly, it is an object of the present invention to provide a new and improved method of bonding elements together wherein such method is not subject to the disadvantages of prior methods while employing vacuum bagging techniques.

Another object of the present invention is to provide a method of bonding elements together with an adhesive which minimizes the entrapment of gas between the bonded elements.

According to the present invention, elements (plastic or otherwise) which are to be bonded together are coated with a suitable adhesive and placed in a collapsible vacuum bag. The bagged part is then placed in a rigid-walled chamber. The bag and the chamber are then simultaneously evacuated of all gas. Since both the bag and chamber are evacuated simultaneously, absolute pressure in the bag is always approximately equal to the absolute pressure around the bag, thereby not creating the atmospheric pressure force which compresses the bag and bonding unit together. This vacuum is maintained for a period of time (depending on the nature of the adhesive material and the shape of the parts to be bonded together) sufficient to remove any gases entrapped between the parts.

The chamber is then vented to atmosphere allowing gas to enter the chamber, tightly compressing the bag by atmospheric pressure thereby firmly pressing the surfaces of the material together. Since substantially all gas is removed from the bag prior to the application of the pressure, the entrapment of gas between the surfaces to be bonded is minimized. The result is a substantially gas-free and therefore void-free bonded assembly.

Figure 2:
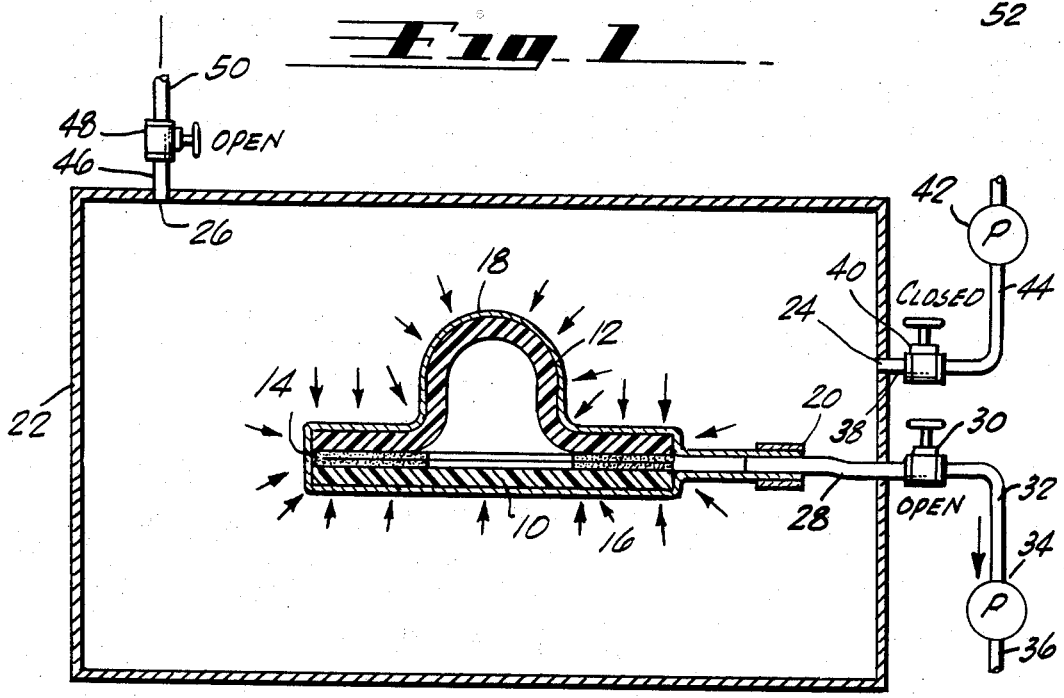

Other and further important objects and features of the invention will become apparent from the following specification, appended claims and accompanying drawing, wherein:

FIGURE 1 is a partially diagrammatic cross sectional view showing the bonding of parts together during one step of the method of the present invention; and FIG. 2 is a cross sectional view similar to FIG. 1 showing the associated parts during a subsequent step of the bonding process.

Referring to the drawing and more particularly to FIG. 1, it is desired that an element 10 is to be bonded to element 12, by a suitable bonding material, such as the adhesive 14. The adhesive 14 is first applied between the elements 10 and 12 and the resulting unit is placed in the vacuum bag 16 having a collapsible, encompassing sidewall 18 and an outlet port 20. This assembly is then disposed within a rigid-walled chamber or container 22 having an outlet port 24 and an inlet port 26. A conduit 28 connects the outlet 20 of bag 16 to valve 30 and a conduit 32 connects the valve 30 to a suitable vacuum pump 34 having an outlet 36. Conduit 38 connects the outlet port 24 of container 22 to valve 40 which is connected to a vacuum pump 42 by conduit 44. Conduit 46 connects the inlet port 26 of container 22 to valve 48 having an outlet 50.

Gas bubbles 52, which may be entrapped between the elements 10 and 12, are evacuated therefrom by placing vacuum pumps 34 and 42 into operation simultaneously with the valves 30 and 40 open and the valve 48 closed. This evacuates the bag 16 and the container 22 simultaneously so that the absolute pressure in the bag 16 is always approximately equal to or greater than the absolute pressure outside the bag. The vacuum pumps 34 and 42 are operated until a minimum absolute pressure is reached in both the bag 16 and the container 22. This minimum absolute pressure is maintained for a period of time sufficient to evacuate the gas bubbles 52. This period of time depends on the nature of the adhesive 14 and nature and shape of the elements 10, 12.

Referring now to FIG. 2, after the gas bubbles 52 have been evacuated, vacuum pump 42 is removed from operation, valve 40 is closed and valve 48 is opened. This vents container 22 to atmosphere permitting atmospheric pressure to tightly force the encompassing sidewall 18 about the elements 10 tnd 12. This squeeze the elements 10 and 12 firmly together under the vacuum in bag 6 substantially eliminating all voids. Vacuum pump 34 is maintained in operation until the adhesive 4 establishes a firm bond.

Having thus described the invention and the present embodiment thereof, it is desired to emphasize the fact that many modifications may be resorted to in a manner limited only by a just interpretation of the following claims.

We claim:
1. Method of adhesively bonding or laminating elements to eliminate entrapped air therebetween and comprising the steps of:
   applying a layer of adhesive resin on an element to be bonded;
   flexibly confining said elements establishing a first enclosed area;
   rigidly confining said flexibly confined elements establishing a second enclosed area encompassing said first enclosed area;
   simultaneously evacuating gases from the first enclosed area and the second enclosed area whereby the absolute gas pressure in said first and second areas is approximately equal and at a minimum value; and
   venting said second enclosed area to atmosphere while maintaining said first enclosed area at the minimum value thereby allowing the atmospheric gas pres- sure to firmly force said elements together, sandwiching said adhesive resin and creating a substantially void-free bonded unit.

2. A method as defined in claim 1 including:
maintaining said minimum pressure in the first and second enclosed areas until all gas bubbles entrapped between said elements are evacuated.

3. A method as defined in claim 2 including:
maintaining said evacuation of said first enclosed area until said elements are solidly bonded together.

References Cited

UNITED STATES PATENTS

| 1,625,396 | 4/1927 | Roberts | 156—285 X |
| 2,992,953 | 7/1961 | Talburtt | 156—382 X |
| 3,234,062 | 2/1966 | Morris | 156—104 |
| 3,236,715 | 2/1966 | Gunderson | 156—285 X |
| 3,330,714 | 7/1967 | Gunderson | 156—286 |

HAROLD ANSHER, *Primary Examiner.*